US006055063A

United States Patent [19]
Yang et al.

[11] Patent Number: 6,055,063
[45] Date of Patent: Apr. 25, 2000

[54] DYNAMIC EXTENSION OF PRINT CAPABILITIES

[75] Inventors: Jennifer Y. Yang, Manhattan Beach; David P. Nesbitt, Redondo Beach; Ton H. Truong, Westminster, all of Calif.

[73] Assignee: Xerox Corporation, Stamford, Conn.

[21] Appl. No.: 08/966,406

[22] Filed: Nov. 7, 1997

[51] Int. Cl.[7] .................................................. G06F 15/00
[52] U.S. Cl. .................. 358/1.15; 358/1.13; 709/201; 711/205
[58] Field of Search ..................................... 395/112, 113, 395/114, 115, 116; 711/205, 206, 207; 709/201, 217, 224, 225; 358/1.13, 1.14, 1.15, 1.16, 1.17

[56] References Cited

U.S. PATENT DOCUMENTS

| | | | |
|---|---|---|---|
| 5,438,650 | 8/1995 | Motoyama et al. .................... | 395/114 |
| 5,559,933 | 9/1996 | Boswell ................................... | 395/114 |
| 5,659,795 | 8/1997 | Duvall et al. .......................... | 395/835 |
| 5,832,274 | 11/1998 | Cutler et al. .......................... | 395/712 |

*Primary Examiner*—Dov Popovici
*Assistant Examiner*—Mark Wallerson
*Attorney, Agent, or Firm*—Oliff & Berridge, PLC

[57] ABSTRACT

A utility that defines additional attributes that would cater to a user's needs provides dynamically extended printing capabilities. The system architecture allows the information to be pushed down transparently to the receiving end, which understands the semantics of the given information. One possible function of the system administrators can be to define information to monitor for accounting purposes. The utility allows additional printer features to be incorporated without disrupting the existing system.

24 Claims, 8 Drawing Sheets

```
Year2000Finishing: :=ENUMERATED ( fin (0,), finl(1) )
Year2000FinishingSyntax ATTRIBUTE-SYNTAX Year2000Finishing
    MATCHES FOR EQUALITY
    : := { oc -run-time-syn 1 104 }  // This defines the OID for this attribute.

BrandNewPrinterAttr : := CHOICE (
    year2000Finishing (0) Year2000Finishing
    year2000Features  (1) SEQUENCE {
        subFeature0    (0) VisibleString,
        subFeature1    (1) Intefer })

BrandNewPrinterAttrSyntax ATTRIBUTE-SYNTAX BrandNewPrinterAttr
    MATCHES FOR EQUALITY
    : := ( oc-run-time 1 106)

oc-run-time being the OID root assigned to Xerox
```

FIG.7

```
year2000Finishing-value-0 = { 1.0.10175.3.5.5.1.105 };
    --assuming oc-run-time == 1.0.10175.3.5.5 )
brandnewPrinterAttr = (
    runtimeOID = { 1.0.10175.3.5.5.1.105 };
    aggregateType = AVT_RunTimeSequence: -- denotes level 0 syntax.
    -- components of this is an aggregate (sequence of) the following
    -- sub-components:

(
        Intergeryear2000Finishing = fin0;
        year2000Feature is an aggregate with the following sub-sub-components:
    (
        aggregateType = AVT_RunTimeSequence
        subFeature0 = OCTET STRING ("Value for sub-feature zero");
        subFeature1 = 1234;
    }
}
```

FIG.8

DYNAMIC EXTENSION OF PRINT CAPABILITIES

BACKGROUND OF THE INVENTION

1. Field of Invention

The invention relates to dynamically extending printing capabilities using dynamic object identifiers. In particular, this invention is directed to enabling a user to define additional attributes without having to modify existing software.

2. Description of Related Art

The enterprise print management systems provide the means to control and access various printers and to manage other related information remotely. However, in the current systems, the extent to which these functions can be utilized is limited by the fixed set of predefined system attributes. Attributes are collections of data that describe the entities that compose the print management system. For example, printer attributes may describe the various printing features that users may use to produce high-quality documents, or they may describe status or configuration information, such as printer's state or location. Hence, when new printers, with new features not defined by existing printing standards, become available in the marketplace, the users cannot readily access these features via outdated print management system. And consequently, the print management systems vendor must upgrade the software and redistribute it to their customers.

SUMMARY OF THE INVENTION

This invention provides a method and apparatus to dynamically extend printing capabilities through the use of dynamic attributes and syntaxes. By using dynamic attributes, the system administrators may define additional attributes that would cater to their site-specific needs (e.g. accounting), and the printer vendors may plug-in the new features to the print management system without any disruption. In addition, these dynamic attributes may take values with syntax that do not adhere to the current standard.

A file format is defined to describe the new attribute, its OID (globally unique "object identifier"), and the syntax of its values. The new attributes can be read-in and registered into the system through a system administration function while the system is down, or automatically without bringing down the system. A unique algorithm is used to break-down the complex attributes into components using simple Document Printing Application (DPA)-defined syntaxes.

These and other features and advantages of this invention are described in or are apparent from the following detailed description of the preferred embodiments.

BRIEF DESCRIPTION OF THE DRAWINGS

The invention is described in detail with reference to the following drawings, wherein like numerals represent like elements and wherein.

DETAILED DESCRIPTION OF PREFERRED EMBODIMENTS

Attributes define or characterize print management system's abstract entities, or objects. For example, document attributes, such as plex, margin, orientation, etc., describe how the printed material should appear. Printer Attributes, such as media-ready, fonts-ready, etc., describe the available resources or features of the printer. In addition to these attributes, there are a suite of attributes to facilitate end-user, operator and administrator functions. In summary, attributes are a set of data that describes the objects of the print management system.

There are three basic elements to an attribute: an object identifier (OID), a syntax and a value. An OID is a globally unique identifier of an attribute which is coded such that it may be understood by all printing systems. The OIDs are allocated following a tree format, such that each printer vendor or standards organization is assigned a branch of this tree. Then each organization may assign unique OIDs by further branching out. For example, the OID of "job-owner" is 1.0.10175.1.3.1.3 in the ISO 10175 standard for Document Printing Applications (DPA). If the server receives the "job-owner" attribute, the server can store the attribute or send this information to an account log upon completion of a print job using the OIDs, for example. Then, an accounting program written by a third party vendor can easily interpret the information in the accounting log through the OIDs.

The syntax of an attribute is the format in which the attribute value is represented. For example, the syntax of the "job-owner" attribute is "distinguishedName", which is an example of coded language the computer or printing system understands.

The value of an attribute is the instance of the attribute. For example, the value of "job-owner" could be "John Jones", i.e., the name of the person to whom the print job belongs.

Figure 1:
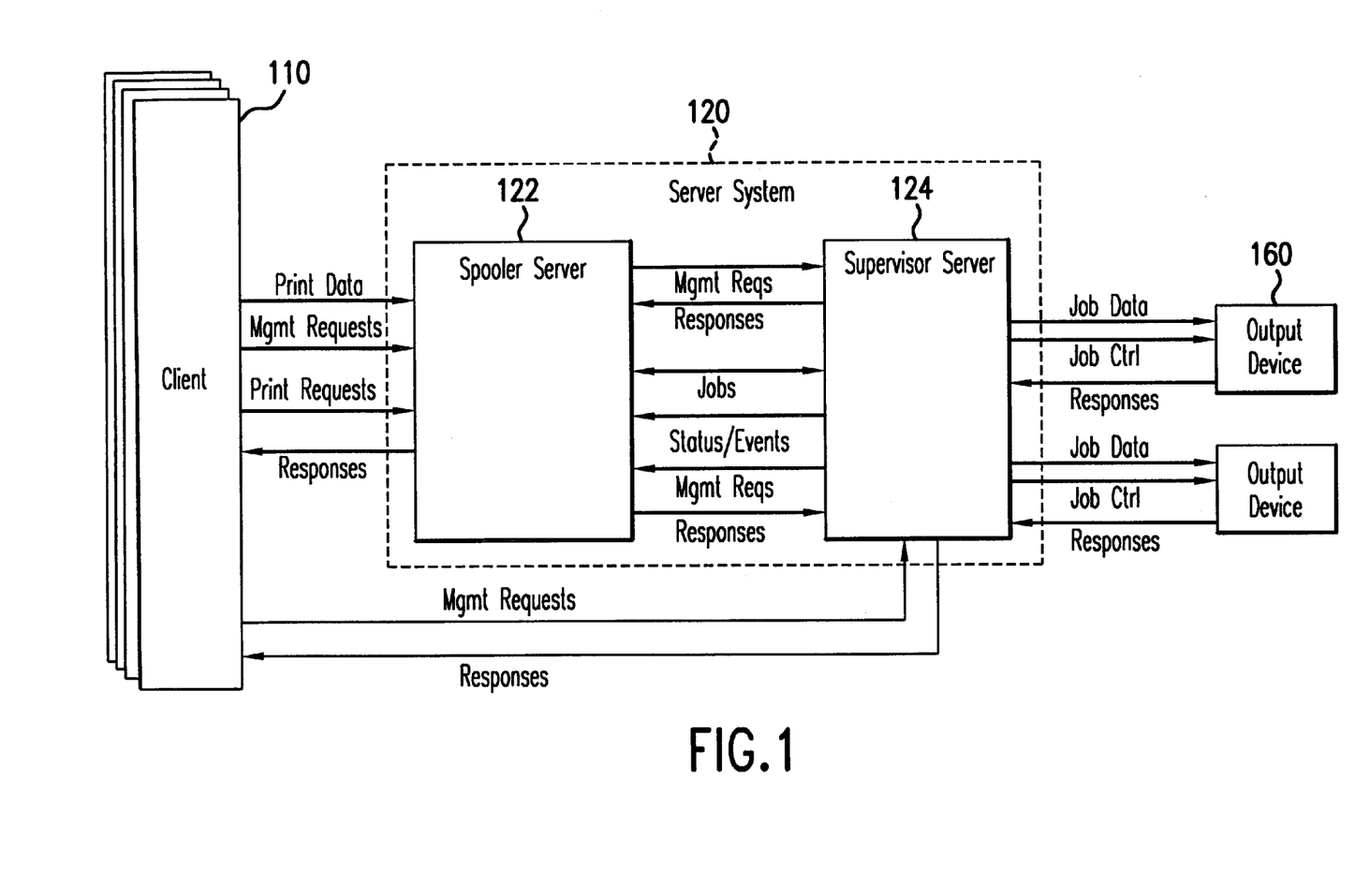
FIG. 1 is a diagram showing the interaction between the client, server and printer.

FIG. 1 is a diagram showing the interaction between the client 110, the server 120 and the output device 160. The output device is, for example, a printer. The client 110 is the interface between the user and the print management system. A spooler 122 takes print requests from multiple clients 110, schedules print jobs based on the print requests and then forwards the print jobs to a supervisor 124. The supervisor 124 provides the common interface between the spooler 122 and the output devices 160The supervisor 124 takes the print jobs from the spooler 122 and invokes the designated printer to render the data.

The client 110 may communicate directly with either the spooler 122 or the supervisor 124 regarding management requests. For example, the system administrator may send a request to the supervisor 124 to modify the access control information, or an end-user may send a request to the supervisor 124 to see the current status of all the printers that the supervisor 124 manages. These print requests and management requests basically communicate the characteristics of the objects of interest. In other words, the information that flows between the client 110 and the server 120 are the attributes and the corresponding values of the objects. For instance, in a print request, the client 110 sends the document data along with document attributes and corresponding values that dictate how to print, what printer to use, who the job owner is, etc. For management requests, the client 110 may query the server 120 for the information about the printers. The server 120 then returns the printer attributes and their corresponding values that describe the status, location, available features, etc.

Figure 2:
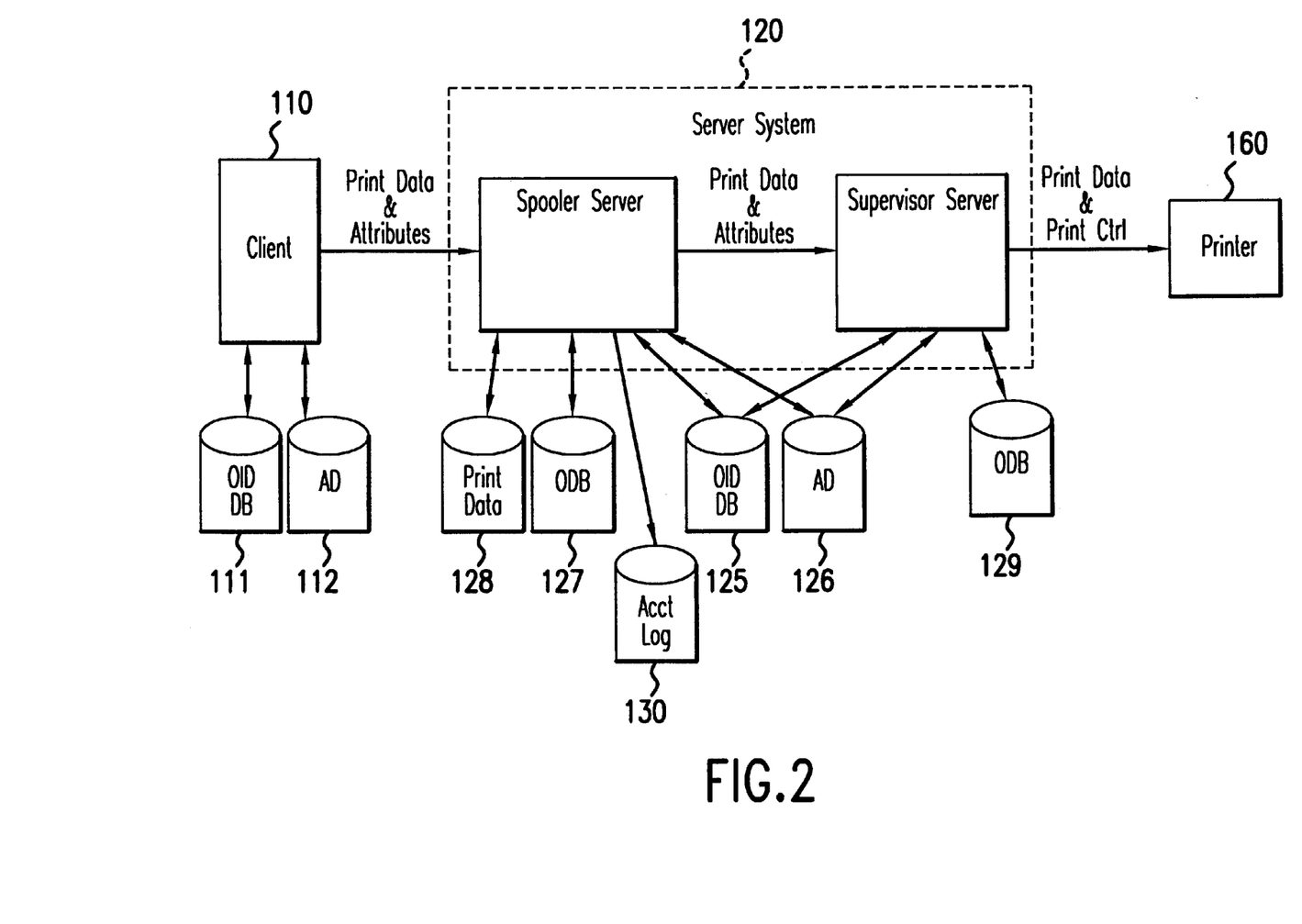
FIG. 2 is a diagram showing the flow of document data in a print request

FIG. 2 shows an overview of the flow of the document data and attributes in a print management system that utilizes the extended print capabilities. The object identifier (OID) databases 111 and 125 store the object identifiers of all the attributes that the print management system supports. The attribute dictionaries (AD) 112 and 126 maintain the non-DPA syntax of any supported attributes. For every attribute that is not in DPA syntax, the complex syntax is broken down to components in DPA-syntax and stored in AD 112. Hence, given an attribute name or OID, the AD 112 returns a sequence of component names (or OID) and their DPA-syntax. The object databases (ODB) 127 and 129 that store the objects and their attribute-value pairs. The print data memory 128 is a temporary storage that keeps the actual contents of the document. The accounting log 130 is a data file that contains the accountable print job information.

When a user submits a print job by selecting documents, the printer and other attributes, the client 110 puts together this data and sends it to the server 120. The server 120 then reads the data and stores the document data in the print data memory 128 and creates a abstract entity, a job object, that contain the attributes specified in the data package from client 110 and stores it in the ODB 127. When the specified printer 160 is ready to print a new job, the server 120 retrieves the document data from the print data memory 128 and sends the document data to the specified printer 160. The server 120 also retrieves the job object attributes from the ODB 127, and based on these attributes, sends print controls to the specified printer 160. When the specified printer 160 completes printing of the document or printing is terminated for any other reason, (i.e. if it is canceled or aborted), the server 120 writes the accounting information to the accounting log 130.

Figure 3:
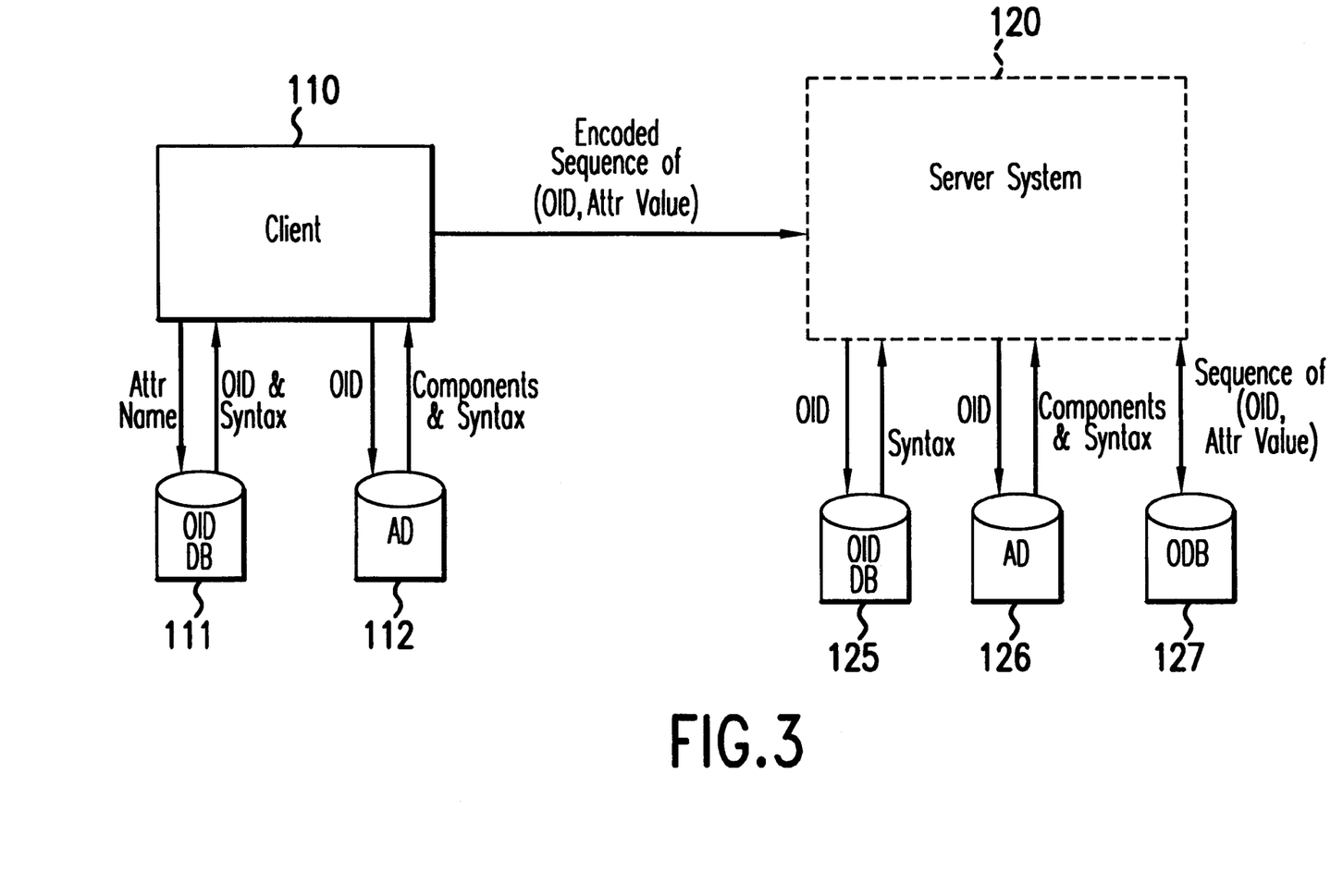
FIG. 3 is a diagram showing the flow of attributes in detail.

FIG. 3 shows in detail the flow of attributes and their corresponding values between the client 110 and the server 120. When the user specifies an attribute, the client 110 queries its OID database 111 with the textural name of the attribute. The object identifier (OID) database 112 returns a globally unique identifier , such as the one discussed above for "job-owner", i.e., 1.0.10175.1.3.1.3, and the syntax. If the syntax is non-standard, then the client 110 further looks in the attribute dictionary 112 for the standard syntax components broken down. The attribute value specified by the user is then interpreted according to this syntax and is grouped with the OID that identifies the attribute. The <attribute-OID, value> pair is encoded and sent by the client across to the server 120. The server 120 queries the OID database 125 and attribute dictionary 126 with the OID. Then based on the syntax, the server 120 puts the <attribute-OID, value> pair in the format that can be readily interpreted by the server 120. This is stored in the object database 127 as part of an object.

Figure 4:
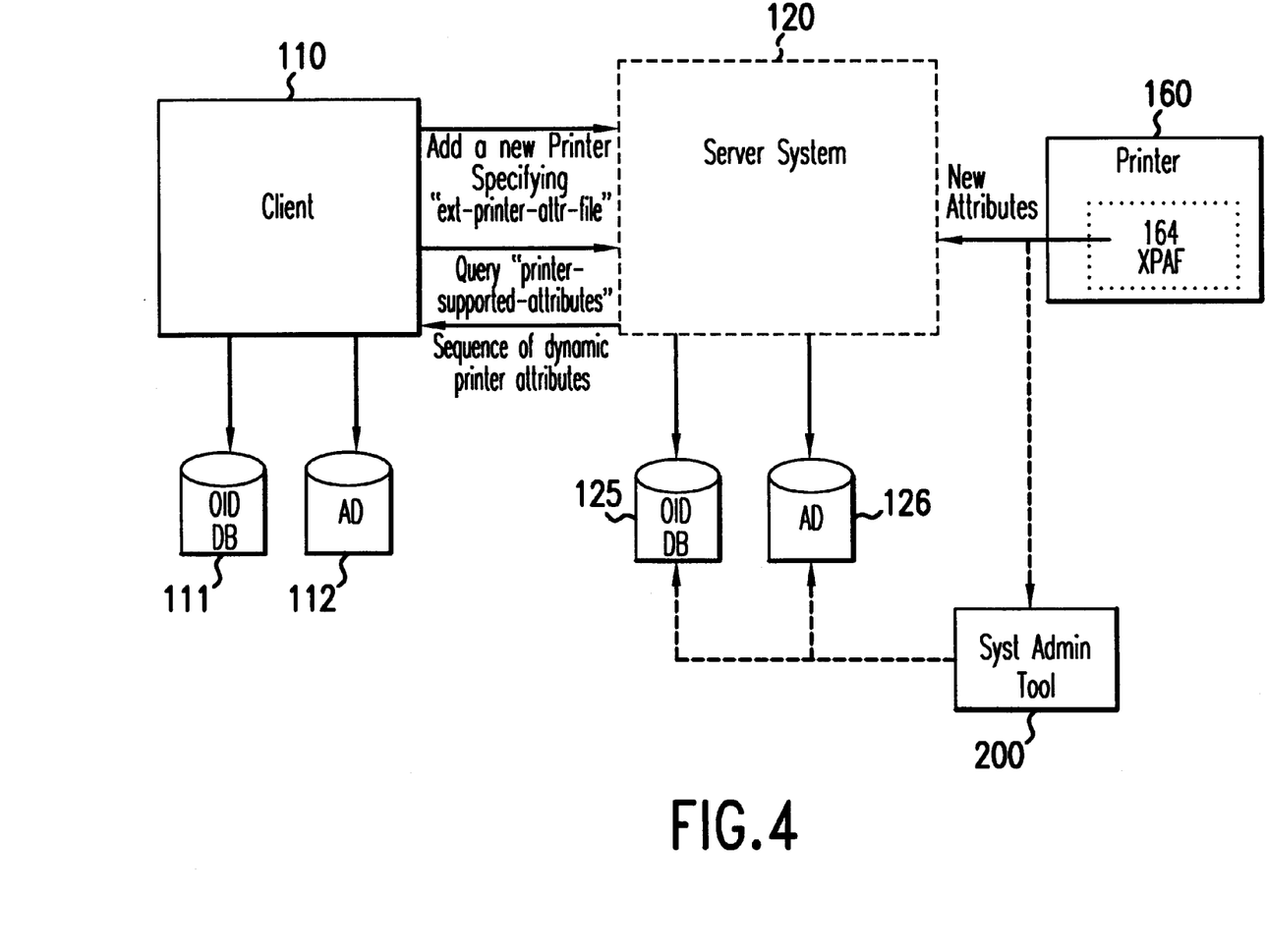
FIGS. 4 and 5 are diagrams showing the methods of introducing dynamic attributes to the system.
Figure 5:
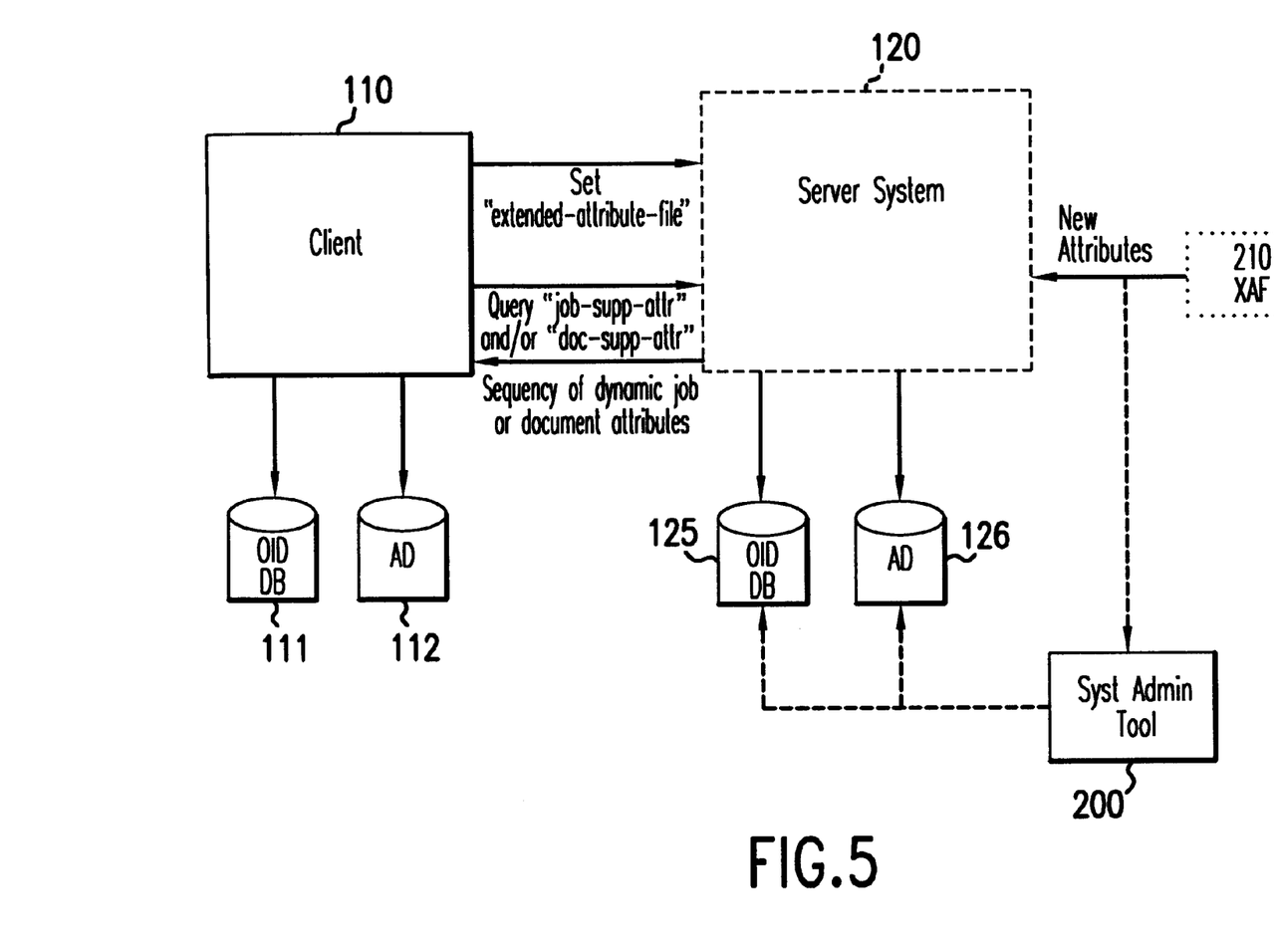

FIGS. 4 and 5 describe how the dynamic attributes can be introduced to the print management system 100. First, the dynamic attributes and syntaxes are registered in the server's OID database 125 and attribute dictionary 126. When a user queries the server 120 for the special attributes "xxx-supported attributes", where "xxx" is an object class, the dynamic attributes are then registered in the client's OID database 111 and attribute dictionary 112. From the users' point of view, there is nothing special about querying these attributes (i.e. querying the server is a standard function). However, the client performs the additional task of updating the databases 111 and 112 in the background.

Registering dynamic attributes to the server's database 125 and the attribute dictionary 126 can be achieved in two ways. One is by running a system administrator tool 200 that reads in a data file 164 that contains the attributes, OIDs and syntax. Another method is an automated registration which reads in the same data file (i.e., without shutting down the servers and using the system administration function, above). The system administrator tool 200 should be run manually when the system is down. The system administrator tool 200 registers the new attributes into the OID database 125. If the attribute syntax is non-standard, the system administrator tool 200 also registers the components of the attributes expressed in DPA-primitive types in the attribute dictionary 126.

The automated registration varies slightly depending on the associated object class of the dynamic attributes. Registering printer attributes will occur when new printers are added to the system. Registering other object attributes will occur when the system administrator sets the "extended-attribute-file". Typically, the file pointed to by this attribute contains job or document attributes for management of site-specific accounting information.

FIG. 4 illustrates how dynamic printer attributes are introduced to the system 100. When a new printer is added to the system, the system administrator creates an abstract printer object that is mapped to the physical device. In the request to create this abstract printer object, the system administrator may specify an "extended-printer-attribute-file" (XPAF file), which is the path to the file that contains the dynamic attribute names, the OIDs and the syntaxes. The server 120 reads this XPAF file, translates the information, and then stores the attribute-name and the OIDs in the OID database 125 and the non-standard syntaxes in the attribute dictionary 126, respectively. When the client 110 queries "printer-supported-attributes", the server 120 returns the names, the OIDs and the syntaxes of all printer dynamic attributes. The client 110 then updates its OID database 111 and the attribute dictionary 112.

FIG. 5 illustrates how dynamic document or job attributes are introduced. As discussed before, a standard management request includes setting or modifying an attribute value of an object. When the system administrator sets "extended-attribute-file", the server 120 reads the file pointed to by this path, translates the information and updates its OID database 125 and the attribute dictionary 126. Updating the client databases 111 and 112 is the same as in updating the printer attributes, except in that the client 110 should query "job-supported-attributes" or "document-supported-attributes".

Figure 6A:
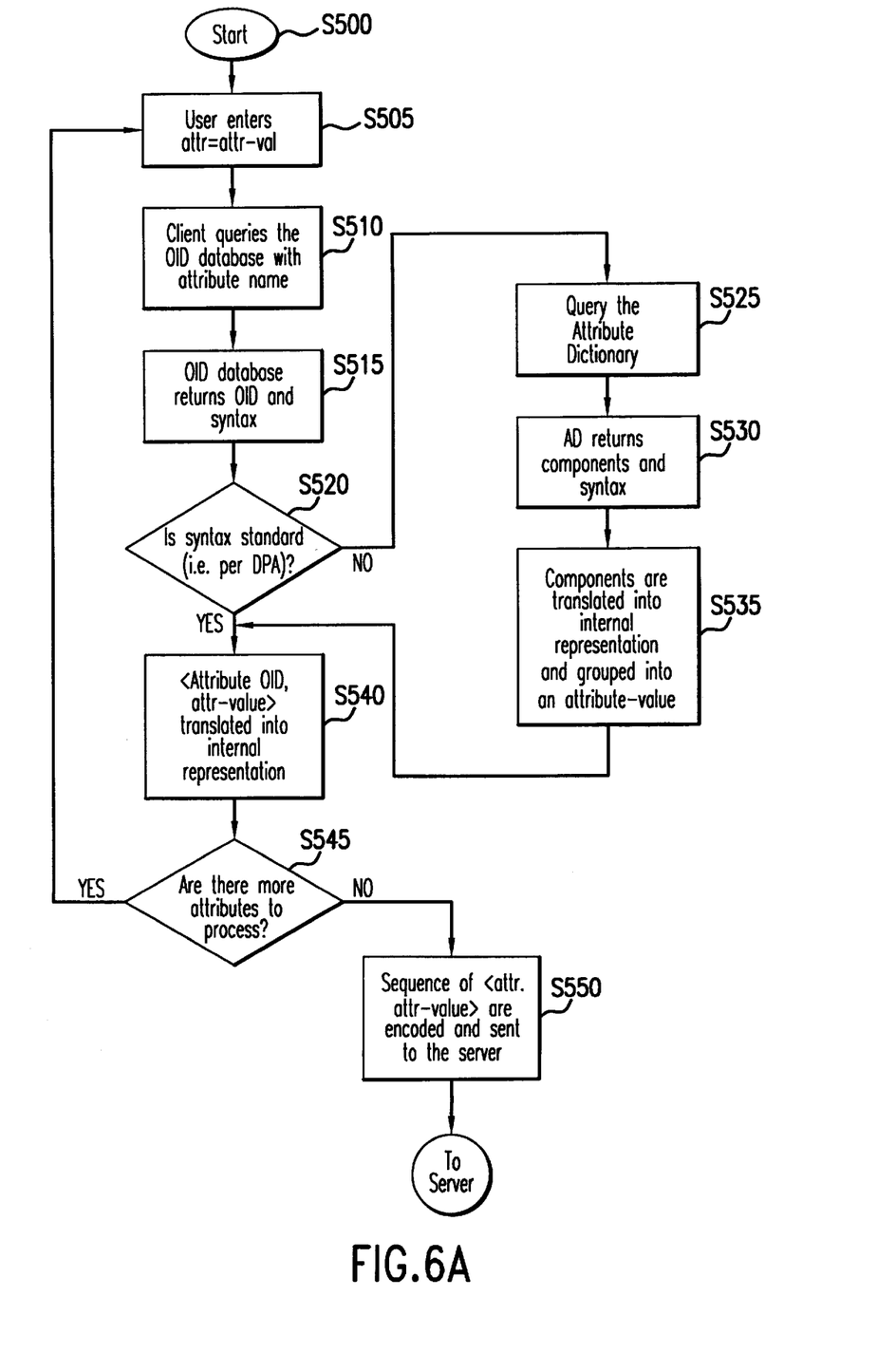
FIGS. 6A and 6B is a flowchart outlining how the dynamic OIDs are processed.
Figure 6B:
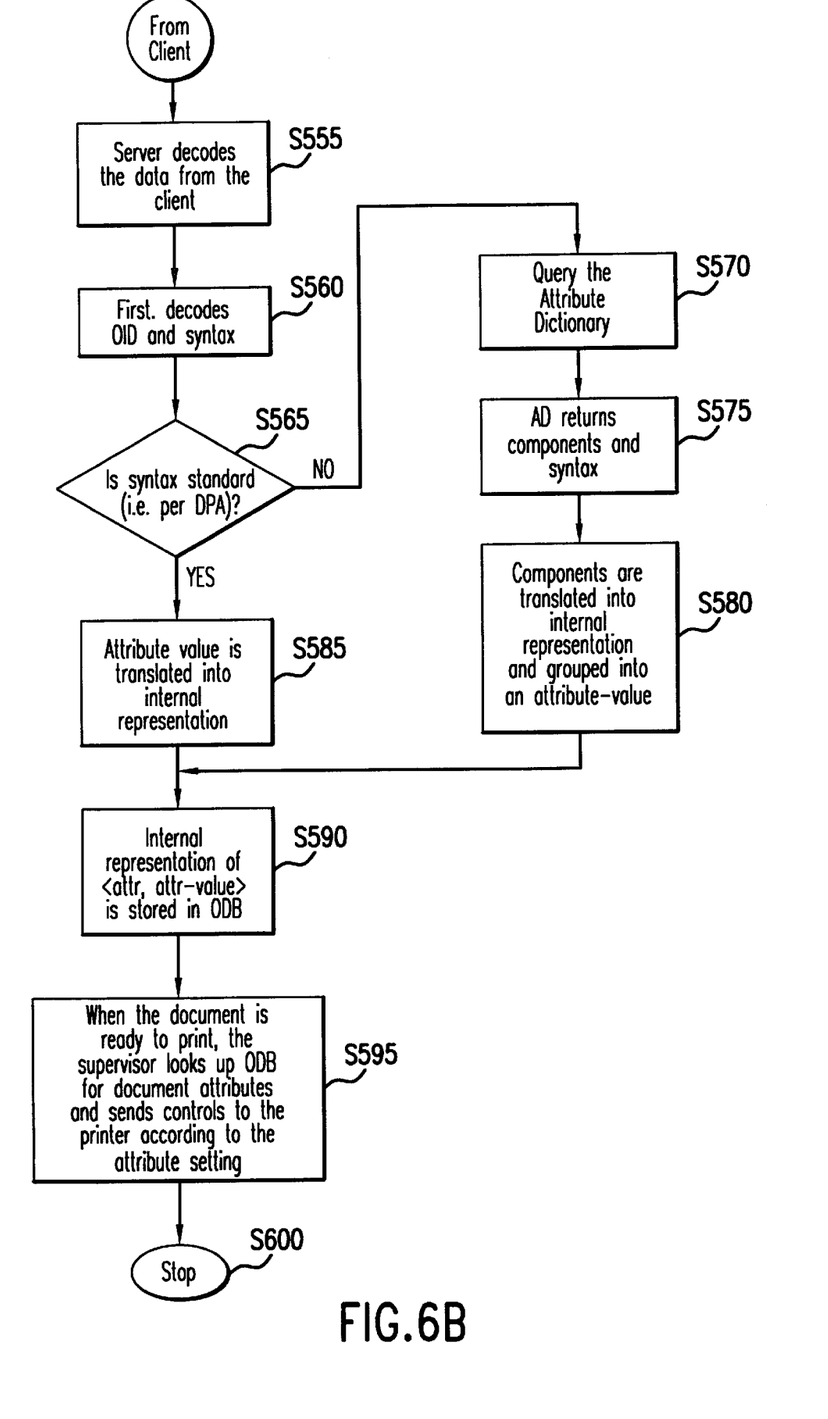

FIGS. 6A and 6B are a flowchart illustrating how document attribute information is passed through the system to the printer160. FIG. 6A shows the document flow on the clientside. FIG. 6B shows the document flow on the server side.

Beginning at step S500, control continues to step S505, where the user specifies an attribute which has a corresponding attribute value. Next, at step S510 the client 110 queries its OID database 111 with the textural name of the attribute. At step S515, the OID database 111 returns the OID and the syntax to the client 110.

At step S520, the client 110 determines whether the syntax is standard (i.e., per DPA standards). If the syntax is non-standard, control continues to step S525. Otherwise, control jumps to step S540.

At step S525, the client 110 queries the attribute dictionary 112 for the standard-syntax components that form the non-standard-syntax attribute. Then, at step S530, the attribute dictionary 112 returns the components and syntax to the client 110. Next, at step S535, the attribute components are translated into internal representation and grouped into an <attribute-OID, attribute value> pair. The client 110 is then ready to process the next user-specified attribute. Control then jumps to step S540.

In step S540, the attribute OID and the attribute value are paired and translated into internal representations. Control then continues to step S545. At step S545, the client 110 determines if all attributes have been checked. If not, control returns to step S505. Otherwise, once all attributes with standard and non-standard syntax are processed, control continues to step S550.

At step S550, the client 110 encodes the <attribute OID, attribute value> pairs and sends them to the server 120.

In FIG. 6B, at step S555, the server 120 decodes the data from the client 110. Then, at step S560, the OID and the syntax are decoded. Next, at step S565, the server 120 determines if the syntax is standard. If the syntax is non-standard, control continues to step S570. Otherwise, control jumps to step S585.

At step S570, the server 120 queries its attribute dictionary 126 for the components broken down into standard syntax. Then, at step S575, the attribute dictionary 126 returns the components and the syntax to the server 120. Next, at step S580, the components are translated into internal representations and grouped into an attribute-value. Control then jumps to step S590. In contrast, at step S585, the attribute value is translated into an internal representation. Control then also continues to step S590

Thus, at step S590, the internal representation of the <attribute OID-attribute-value> pair is stored in the object database 129. Then, at step S595 when the document is ready to print, the supervisor 124 retrieves the document attributes from the object database 129 and sends control signals to the printer 160 according to the attribute settings. Control then continues to step S600, where the control routine stops.

Figure 7:
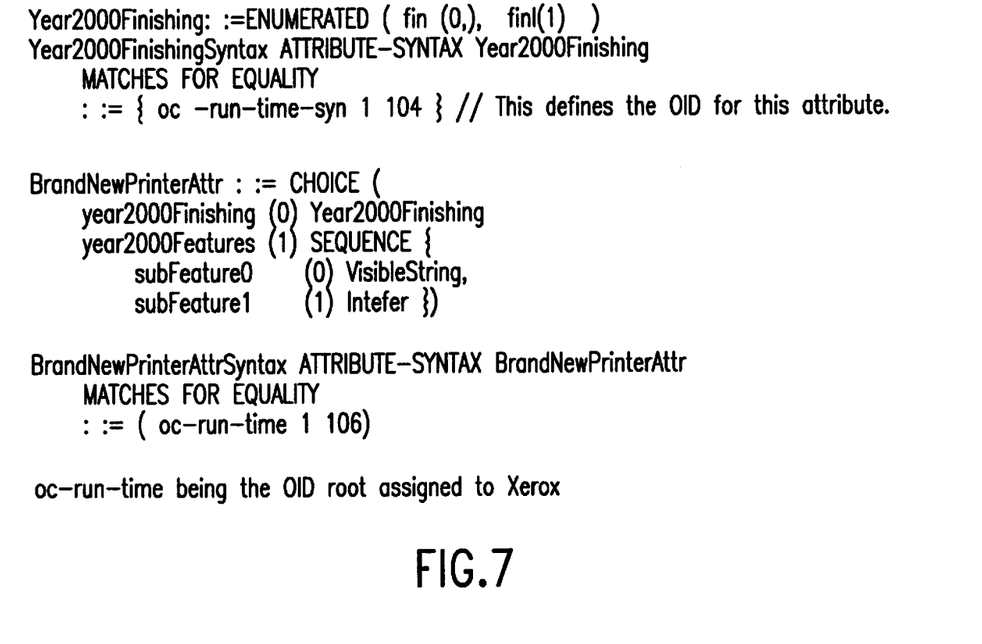
FIG. 7 is an example of ASN.1 syntax for a new feature of newly released printer.
Figure 8:
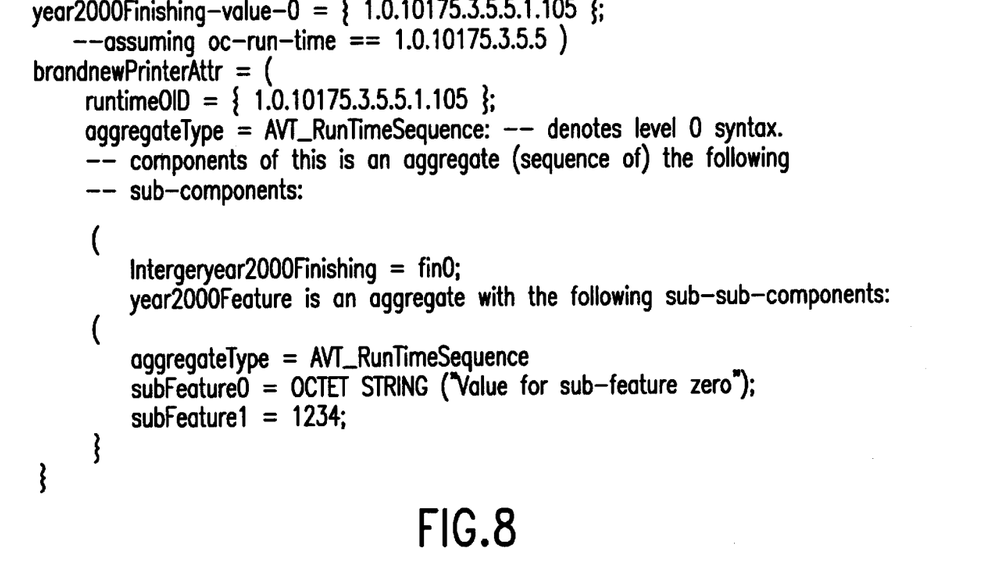
FIG. 8 is the pseudo C structure for the example in FIG. 7.

The following scenario illustrates how these dynamic OIDs function. Company X releases a new printer 162 that has the new finishing feature expressed in ASN.1 syntax, as shown in FIG. 7. This finishing feature is stored as part of the XPAF file 164. When the printer 162 is first connected to the system 100, the system reads the XPAF 164 file. The system 100 then translates the feature into a pseudo-C structure, as shown in FIG. 8.

A data structure denoting this complex syntax is stored in the attribute dictionary 114, and is retrievable at run-time. The client 110 can retrieve this attribute and use the information to build the globally unique identifier at run-time to allow the user to manipulate the dynamic attribute.

As shown in FIGS. 3–6B, as well as in the example outlined above, the implementation of dynamic OIDs is preferably performed on a programmed general purpose computer. However, the implementation of dynamic OIDs can also be performed on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FGPA or PAL, or the like. In general, any device on which a finite state machine capable of implementing the flowchart shown in FIGS. 6A and 6B and the example illustrated above, can be used to perform the implementation of the dynamic OIDs.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A system for providing dynamic extension of print management capabilities, comprising:
   a first processor that sends and receives signals to and from an output device;
   a second processor that processes print requests received from a third processor and communicates with the first processor;
   the third processor that submits print requests to the second processor and queries, manipulates, controls and forwards print data to the second processor;
   a first database that stores static and dynamic attribute syntaxes of the signals, wherein static attributes are stored into the first database at the system's code compiling time and dynamic syntaxes are characteristics of the output device not known at the system's code compiling time;
   a second database that stores attribute values corresponding to the static and dynamic attribute syntaxes of the signals;
   wherein the first processor and the second processor each retrieve the static and dynamic attribute syntaxes from the first database and attribute values corresponding to the static and dynamic attribute syntaxes from the second database, when print requests are processed and output device control operations are performed.

2. The system of claim 1, wherein each static and dynamic attribute has an object identifier (OID), a syntax and a value.

3. The system of claim 2, further comprising a system administrator tool that registers the dynamic attributes' object identifiers (OIDs) into the first database.

4. The system of claim 1, wherein the first and second processors require no software upgrade to process the dynamic attribute syntaxes.

5. The system of claim 1, wherein the third processor specifies the dynamic attribute syntaxes when print requests are processed and output device control operations are performed.

6. The system of claim 1, wherein if the signal's format is known at compiling time, the first and second processor uses the static attribute syntaxes to interpret the data, and if the signal's format are not known at compiling time, the first and second processor uses the dynamic attribute syntaxes to interpret the data.

7. The system of claim 1, wherein the first processor reads a printer attribute file containing dynamic attribute syntaxes for the output devices when print requests are processed and output device control operations are performed, and stores the dynamic attribute syntaxes into the first database.

8. The system of claim 1, wherein the first and second processors use the dynamic attribute syntaxes to format the signals sent to the output device and interpret the signals received from the output device.

9. The system of claim 1, wherein the first and second processors retrieve the characteristics of a given attribute based on a given static or dynamic attribute object identifier (OID).

10. The system of claim 1, wherein the third processor processes and displays characteristics of static and dynamic attributes.

11. The system of claim 1, wherein new dynamic attribute object identifiers (OIDs) are added to the first database when print requests are processed and output device control operations are performed.

12. The system of claim 1, wherein the first and second processors store, query and manipulate static and dynamic attribute values.

13. A method for providing dynamic extension of print management capabilities, comprising:

sending and receiving signals to and from an output device at a first processor;

processing print requests at a second processor received from a third processor, wherein the first processor communicates with the second processor;

submitting print requests to the second processor from the third processor wherein the third processor queries, manipulates, controls and forwards print data to the second processor;

storing static and dynamic attribute syntaxes of the signals in a first database, wherein the static attributes syntaxes are stored into the first database at a code compiling time and the dynamic attribute syntaxes are characteristics of the output device not known at the code compiling time; and storing attribute values of the signals in a second database;

wherein the first processor and the second processor each retrieve the static and dynamic attribute syntaxes from the first database and attribute values corresponding to the static and dynamic attribute syntaxes from the second database, when print requests are processed and output device control operations are performed.

14. The method of claim 13, wherein each static and dynamic attribute received has an object identifier (OID), a syntax and a value.

15. The method of claim 12, wherein no software upgrades are needed to process the dynamic attribute syntaxes.

16. The method of claim 14, further comprising registering dynamic attributes' object identifiers (OIDs) into the first database.

17. The method of claim 13, further comprising specifying the dynamic attribute syntaxes at the third processor when print requests are processed and output device control operations are performed.

18. The method of claim 13, wherein if the signal's format is known at compiling time, the first and second processor uses the static attribute syntaxes to interpret the data, and if the signal's format are not known at compiling time, the first and second processor uses the dynamic attribute syntaxes to interpret the data.

19. The method of claim 13, wherein the first processor reads a printer attribute file containing dynamic attribute syntaxes for the output devices when print requests are processed and output device control operations are performed, and stores the dynamic attribute syntaxes into the first database.

20. The method of claim 13, wherein the first and second processors use the dynamic attribute syntaxes to format the signals sent to the output device and interpret the signals received from the output device.

21. The method of claim 13, wherein the first and second processors retrieve the characteristics of a given attribute based on a given static or dynamic attribute object identifier (OID).

22. The method of claim 13, further comprising processing and displaying characteristics of static and dynamic attributes at the third processor.

23. The method of claim 13, further comprising adding new dynamic attribute object identifiers (OIDs) to the first database when print requests are processed and output device control operations are performed.

24. The method of claim 13, wherein the first and second processors store, query and manipulate static and dynamic attribute values.

* * * * *